United States Patent [19]
Kirk et al.

[11] Patent Number: 5,407,153
[45] Date of Patent: Apr. 18, 1995

[54] SYSTEM FOR INCREASING AIRPLANE FUEL MILEAGE AND AIRPLANE WING MODIFICATION KIT

[75] Inventors: Philip S. Kirk, Redmond, Wash.; Richard Whitcomb, Hampton, Va.

[73] Assignee: Valsan Partners, Purchase, N.Y.

[21] Appl. No.: 71,696

[22] Filed: Jun. 4, 1993

Related U.S. Application Data

[63] Continuation-in-part of Ser. No. 660,772, Feb. 25, 1991, abandoned.

[51] Int. Cl.[6] .............................................. B64C 3/26
[52] U.S. Cl. ................................. 244/199; 244/215; 244/123
[58] Field of Search ............... 244/213, 214, 215, 216, 244/199, 198, 130, 45 R, 123, 124

[56] References Cited

U.S. PATENT DOCUMENTS

| | | |
|---|---|---|
| 1,095,952 | 5/1914 | Arnoux . |
| 1,656,193 | 1/1928 | Hall . |
| 1,724,110 | 8/1929 | Reid . |
| 2,576,981 | 12/1951 | Vogt . |
| 3,845,918 | 11/1974 | White . |
| 4,050,397 | 9/1977 | Vanderleest . |
| 4,108,403 | 8/1978 | Finch . |
| 4,190,219 | 2/1980 | Hackett . |
| 4,205,810 | 6/1980 | Ishimitsu . |
| 4,238,094 | 12/1980 | McGann . |
| 4,245,804 | 1/1981 | Ishimitsu . |
| 4,725,020 | 2/1988 | Whifener ........................... 244/76 R |
| 4,796,192 | 1/1989 | Lewis .................................. 244/76 R |
| 5,088,661 | 2/1992 | Whifener ........................... 244/76 R |

OTHER PUBLICATIONS

Whitcomb, NASA Technical Note TN D-8260, "A Design Approach and Selected Wind-Tunnel Results at High Subsonic Speeds for Wing-Tip Mounted Winglets", Jul. 1976 (30 pages).

Flechner et al., NASA Technical Note TN D-8264, "A High Subsonic Speed Wind-Tunnel Investigation of Winglets on a Representative Second-Generation Jet Transport Wing", Jul. 1976 (66 pages).

Jacobs et al., NASA Technical Note TN D-8267, "The Effect of Winglets on the Static Aerodynamic Stability Characteristics of a Representative Second Generation Jet Transport Model", Jul. 1976 (30 pages).

*Primary Examiner*—Galen L. Barefoot
*Attorney, Agent, or Firm*—Cooper & Dunham

[57] ABSTRACT

A system is provided which enables winglets to be added to existing wing structures of 727 model aircraft to increase fuel efficiency while providing a means for redistributing additional loads created by the winglets so that modified aircraft can be operated safely and within government regulations. Re-setting of existing wing flaps and ailerons safely offsets the load increase caused by the addition of winglets and also contributes to increased fuel efficiency. An airplane wing modification kit comprises a winglet and modified components for re-rigging the settings of ailerons and flaps of existing 727 model airplanes.

12 Claims, 19 Drawing Sheets

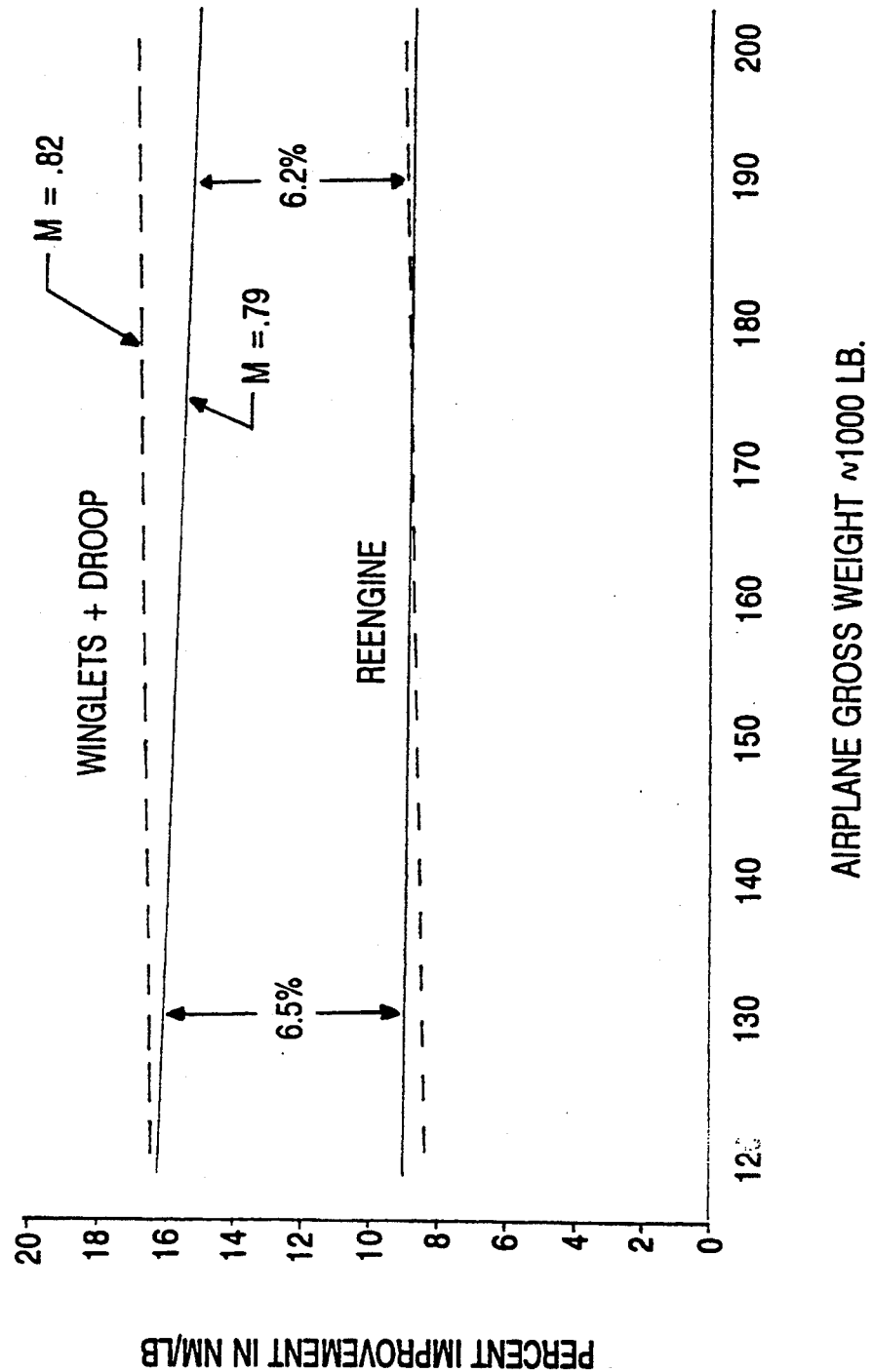

SYSTEM FOR INCREASING AIRPLANE FUEL MILEAGE AND AIRPLANE WING MODIFICATION KIT

CROSS REFERENCE

This application is a continuation-in-part (CIP) of application Ser. No. 07/660,772, filed Feb. 25, 1991, now abandoned, the specification of which is hereby incorporated by reference into the present application.

BACKGROUND OF THE INVENTION

The present invention relates to a new and useful improvement in airplane performance. More specifically, the present invention relates to a system for increasing airplane fuel mileage and decreasing drag suitable for 727 model aircraft, particularly by means of an airplane wing modification kit.

From the first days of commercial air travel, methods and devices for increasing fuel efficiency of commercial aircraft have been desired.

Winglets long have been used in the aircraft industry as a method for reducing drag, the retarding forces which act on an airplane as it moves through the air. Decreased drag results in increased fuel efficiency.

Winglets are small lifting surfaces attached to the outboard end of an airplane wing, commonly at or near to a vertical angle from the wing structure. Winglets function to relocate the tip vortex of an airplane wing further outboard and above the unmodified location. In flight, the substantially inward pointing load carried by the winglets relocates the wing tip vortex.

Due to pressure differentials between wing surfaces at a wing tip, air tends to flow outboard along the lower surface of a wing around the tip and inboard along the wing upper surface. When winglets are added, the relocated wing tip vortex caused by the winglets produces cross-flow at the winglets, which often are perpendicular to the flow across the wing surfaces. The side forces created by such cross-flow contain forward components which reduce drag.

Various winglet configurations and placements have been suggested and are shown in issued patents. Some have been used since the earliest days of manned flight. See, e.g., Arnoux U.S. Pat. No. 1,095,952, patented May 5, 1914, and Hackett U.S. Pat. No. 4,190,219, patented Feb. 26, 1980, which show the use of winglets.

In the 1970's, the National Aeronautics and Space Administration ("NASA") suggested a modern, trapezoidal shape for winglets as a method for reducing drag and increasing fuel efficiency.

NASA also has published a report entitled "KC-135 Winglet Program Review", NASA conference publication 2211. The NASA winglets described in that publication generally are trapezoidal. The leading edge of the winglet is at a 38° angle from the vertical and the trailing edge is at a lesser angle. The tip chord of the NASA winglet is about one-third the length of the root or base chord. The NASA winglet in position is canted outwardly from the wingtip at a cant angle of 15° and positioned toward the trailing edge of the wing.

Airframe manufacturers also have proposed the use of winglets. Ishimitsu U.S. Pat. Nos. 4,205,810, patented Jun. 3, 1980 and 4,245,804, patented Jan. 20, 1981, disclose winglets. The earlier Ishimitsu '810 patent shows and describes winglets which are vertically positioned with respect to the wings and are not canted outwardly. The later Ishimitsu '804 patent shows and describes winglets which are canted outward, enabling greater control of the winglet center of gravity to alleviate wing flutter, or oscillation. A strake, or band, having an aerodynamically contoured leading edge is added between the leading edge of the winglet and the upper surface of the wing.

Performance improvements obtained as a result of winglet additions are reduced drag and increased wing buffet margin. Wing buffet occurs when lift on a wing is so great that it causes flow separation and wing stall, and subsequently limits the boundary for the aircraft. The reduction in drag brings increased aircraft fuel mileage at all altitudes, while the increased buffet margin allows the aircraft to fly at higher altitudes where fuel mileage is increased.

While winglets have been shown to increase fuel mileage in 727 model aircraft, the addition of winglets also creates a major operational problem. Inherent in the way that a winglet functions to reduce drag is the tendency of the winglet to increase wing bending and shear loads over the outboard portion of the wing. Such loads are further increased when a winglet is canted outward from the vertical.

Winglets could have no beneficial effect without also inducing this load increase. However, as the wing structure of 727 model aircraft originally was designed only to carry the load of an unmodified wing, it is a difficult problem to sustain the higher load introduced by the addition of a winglet while simultaneously maintaining margins of safety that satisfy Federal Aviation Administration regulations. The excessive wing loads and stress caused by the addition of winglets has made them impractical for use in 727 model aircrafts. The alternative, reinforcement of existing wing structure to support the winglets, is extremely expensive.

SUMMARY OF THE INVENTION

It is an object of the present invention to provide a system which will enable 727 model jet aircraft to operate at greater fuel efficiency while complying with all relevant Federal Aviation Administration ("FAA") regulations.

It is another object of the present invention to enable the utilization of winglets to increase fuel mileage achieved by 727 model jet aircraft without the need for substantial structural alterations to existing wing structure of the aircraft.

It is still another object of this invention to provide a retrofit or airplane wing modification kit for existing three-engine B-727 model jet aircraft which enables the utilization of winglets to increase fuel mileage and provides a means of redistributing wing bending and shear loads typically produced by the addition of winglets.

The present invention is an improvement on the prior art and discloses a novel airplane wing modification kit which enables aerodynamically designed winglets to be utilized to increase fuel mileage of all existing 727 model aircraft without necessitating substantial and costly structural modifications previously thought to be necessary to comply with FAA regulations.

Existing inboard and outboard aft wing flaps and inboard wing ailerons are repositioned to redistribute the loads added by the winglets and further decrease drag and increase fuel mileage. The flaps and ailerons are re-rigged such that their permanent neutral settings are reset.

The resetting of the flaps and ailerons, so that they extend partially away from the trailing edge of the wing, is known as "droop". This "droop" has the beneficial effect of offsetting load increases caused by the addition of the winglets, reducing aerodynamic drag, and allowing modified 727 aircraft to be operated safely and within FAA regulations.

The system is particularly useful in the modification of existing Boeing Model 727 aircraft having JTSD-7/9/15/17 engines, and particularly with those aircraft re-engined so as to meet FAR Part 36, Stage 3, noise level requirements. The components of the system may be combined in an airplane wing modification kit for retrofitting existing airplanes.

BRIEF DESCRIPTION OF DRAWINGS

FIG. 19 is a plot of percent improvement in fuel mileage versus airplane gross weight for 727 aircraft modified in accordance with the present invention.

DETAILED DESCRIPTION OF THE INVENTION

Figure 1:
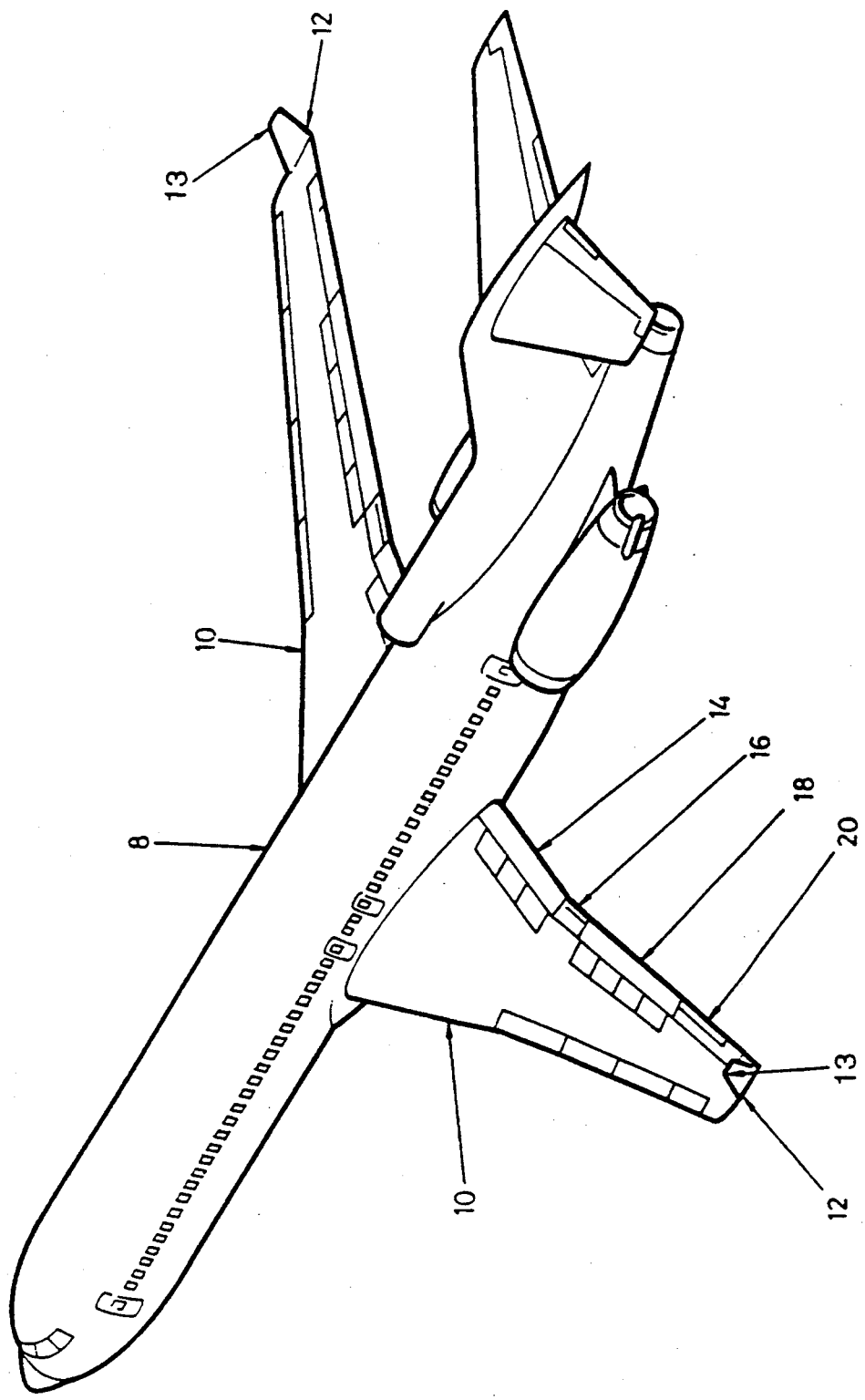
FIG. 1 is a rear perspective view of a 727 aircraft modified in accordance with the present invention.

The present invention contemplates an airplane wing modification system for increasing the fuel mileage of an airplane. The modification comprises a kit which includes outwardly canted winglets to replace the existing wingtip structures together with apparatus for changing the neutral positions of existing wing flaps and ailerons. The combination of these changes working together increases fuel mileage of the modified aircraft.

The flaps of an airplane are used during take-offs and landings, and the ailerons are used to control lateral movements of the airplane in all phases of flight. There are two sets of flaps and ailerons on each 727 model aircraft wing.

Flaps and ailerons on unmodified 727 model aircraft wings are ineffective in distributing increased loads caused by the addition of winglets to the wing. The flap and aileron modifications of the present invention compensate and also redistribute the increased loads caused by the addition of winglets inboard of the wings, nearer the fuselage, enabling the wing to function with the addition of winglets and substantially contributing to net increased wing efficiency.

The novel modulated flap and aileron modifications of the present invention enable the installation of winglets on the vast, existing 727 model aircraft fleet. The design of the present invention avoids the need for active control surfaces or substantial wing structural modifications inboard of the tip area.

The unmodified 727 model wing, originally designed in the early 1960's, is derived from wings developed at a time when aircraft flew at low Mach numbers, and a primary goal was to produce low skin friction drag. At high Mach number speeds, such as those achieved by the 727 model aircraft, strong shock waves form on the upper wing surface of the unmodified wing. This causes a large increase in drag as the airplane Mach number increases as well as other non-linear effects such as pitch and lift divergence. Further, as fuel efficiency was not a predominant concern, the wing aspect ratio chosen was fairly low.

The combination of the existing 727 model wing design and low aspect ratio creates the following deficiencies: (a) relatively high lift-induced drag; (b) rapid increase in drag with increased Mach number (early drag rise); (c) early onset of wing buffet at typical cruise Mach numbers; and (d) appearance of pronounced nose-down pitch at relatively low Mach numbers. The system of the present invention economically reduces these deficiencies to facilitate the addition of winglets.

A crucial limitation to adding winglets to the 727 wing is that stress analysis of the wing shows the mid span portion of the wing to have a very small load margin of safety, on the order of only 1%, which was insufficient for the anticipated additional bending moment and shear loads caused by the winglet alone without compensating design changes. This structural problem is solved by the lift provided by the modifications, or modulated "droop", of the present invention to existing ailerons and flaps.

Existing 727 model wing flap assemblies are triple slotted and consist of three flap segments, the forward vane, the mid flap, and the aft flap. In the design of the present invention, only the aft flap segments are re-rigged, and serve to prevent loads from exceeding safe levels over the critical mid-span region.

The flap and aileron "droop" produces substantial aerodynamic benefits to the wing. The "droop" has the effect of moving some of the lift further aft on the airfoil, simulating one aspect of a modern aft-loaded supercritical airfoil and resulting in substantial reduction in the drag increase with Mach number (early drag rise). This accounts for about half the total drag reductions of the present invention at typical cruise conditions.

The modulated "droop" of the present invention to wing flaps and ailerons also produces a further aerodynamic benefit to the aircraft by increasing the wing buffet margin by about 8%. Wing buffet occurs when the lift on the wing is so great that it causes flow separation and wing stall, and subsequently limits the operational range of Mach number and lift coefficient for the aircraft. Wing buffet is detrimental and increases at higher altitudes. The modulated "droop" of the ailerons and flaps increases the lift coefficient at which the flow starts to separate from the upper surface of the airfoil causing induced buffet. The higher buffet margin allows the wing to be operated at higher lift coefficients and thus the aircraft to be flown at higher altitudes. At these higher altitudes, the fuel consumption is less, by about 6.5%. Aircraft maneuverability also is improved by increased buffet margins, since the 727 wing is limited by maneuver margin requirements to about 1.3 g from buffet margin. The design changes to effect modulated "droop" make the addition of winglets of the present invention commercially feasible.

Figure 2:
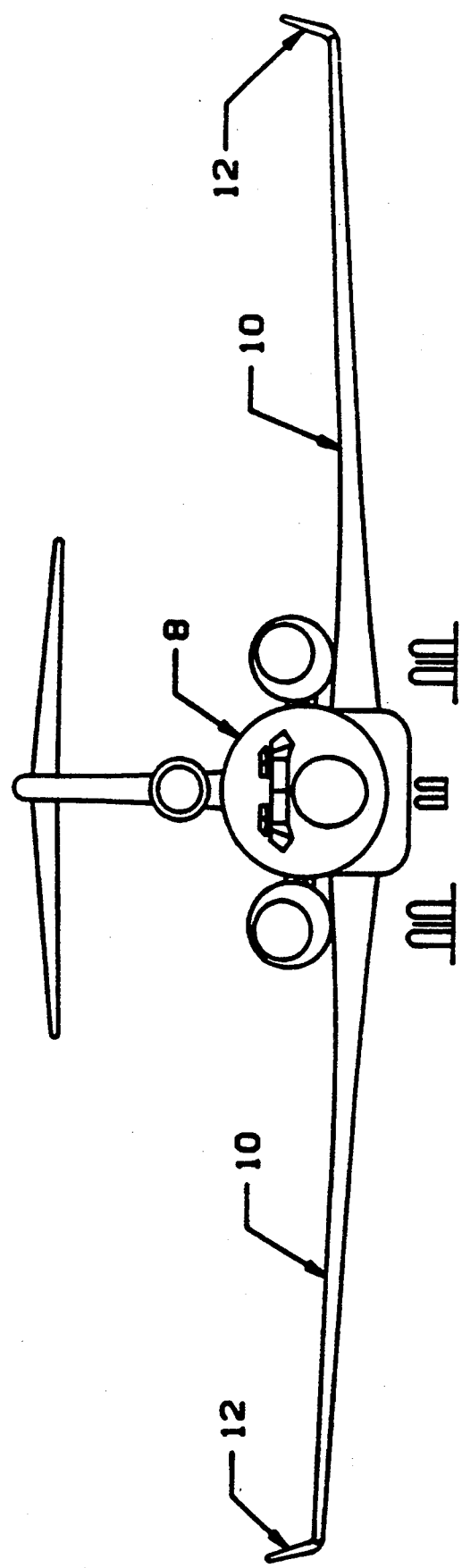
FIG. 2 is a front elevational view of a 727 aircraft modified in accordance with the invention.
Figure 3:
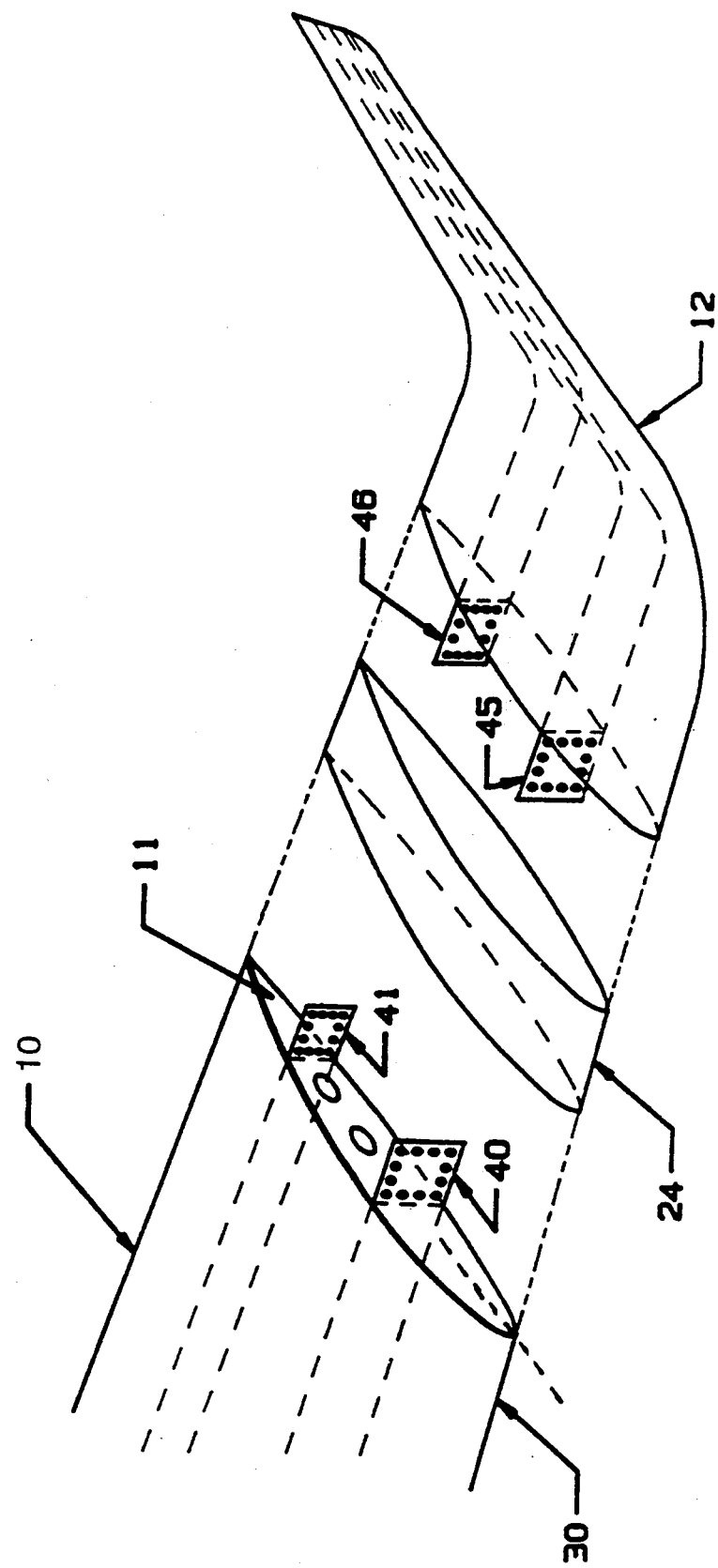
FIG. 3 is a top perspective view of a composite tip/winglet assembly.

Generally, as shown in FIGS. 1 and 2 of the drawings, the present invention relates to an airplane wing modification kit for B-727 aircraft 8. The modification includes the replacement of existing wingtip structures of wings 10 with composite tip/winglet assemblies 12, as best seen in FIG. 3. The modification also includes the resetting of inboard aft wing flaps 14, inboard ailerons 16 and outboard aft wing flaps 18.

Figure 4:
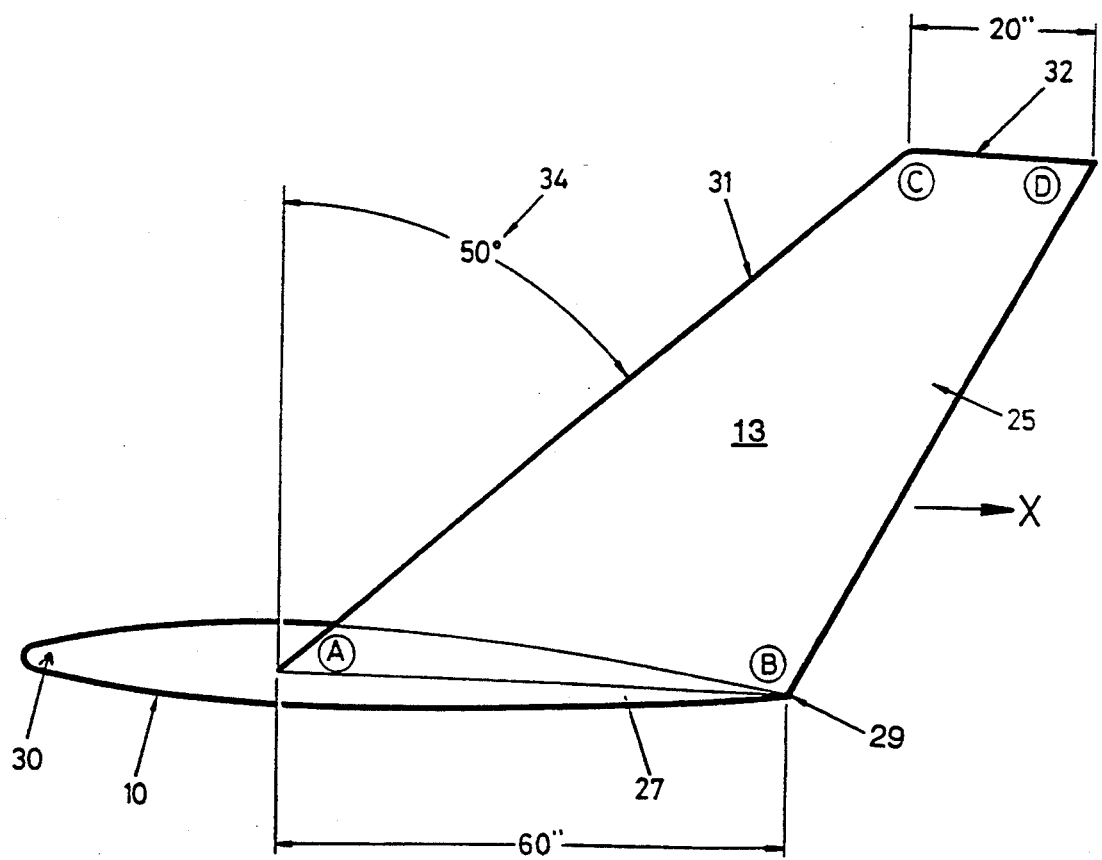
FIG. 4 is a side elevational view of an airplane wing modified with a composite tip/winglet assembly.
Figure 5:
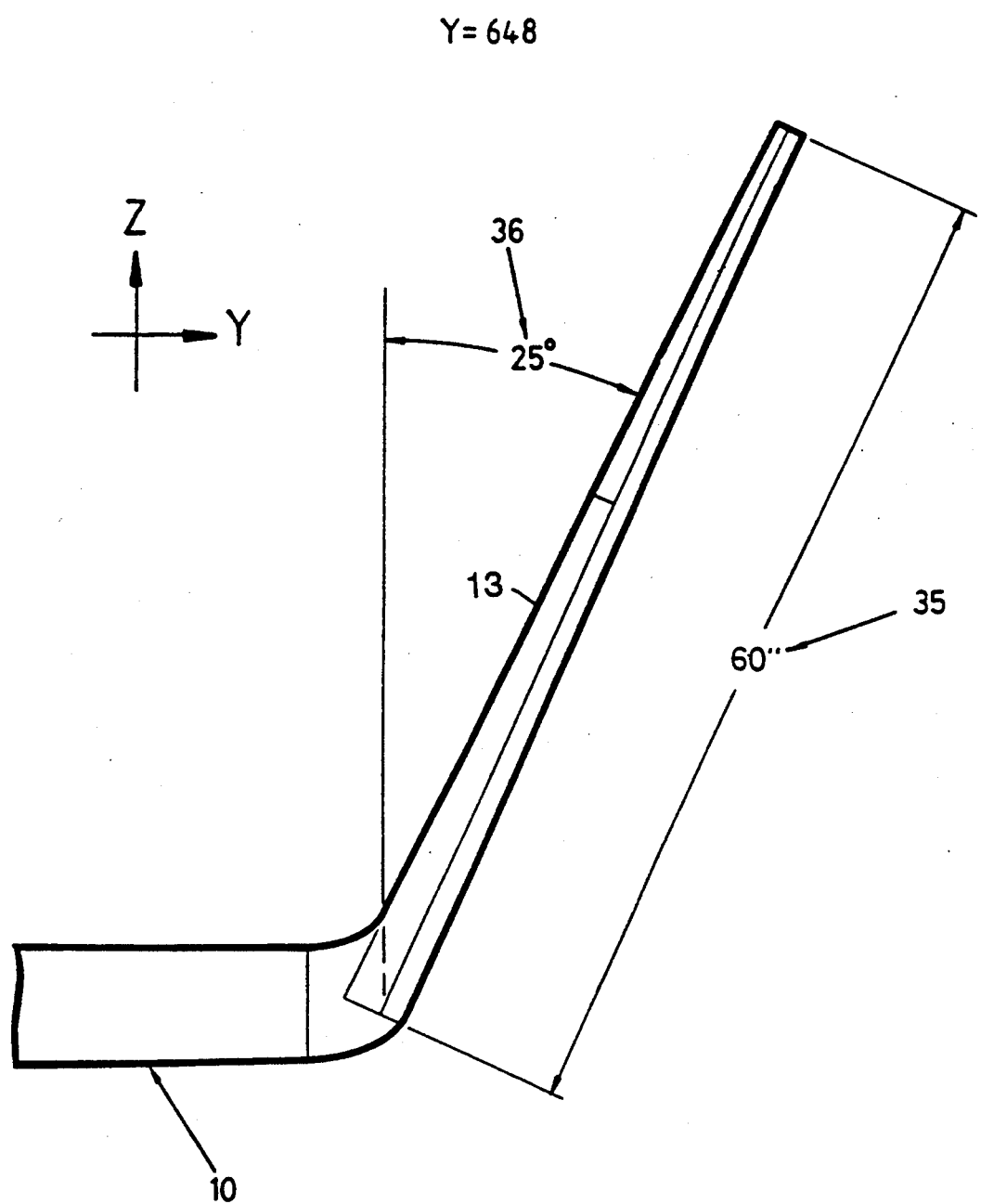
FIG. 5 is a front elevational view of a composite tip/winglet assembly.
Figure 6:
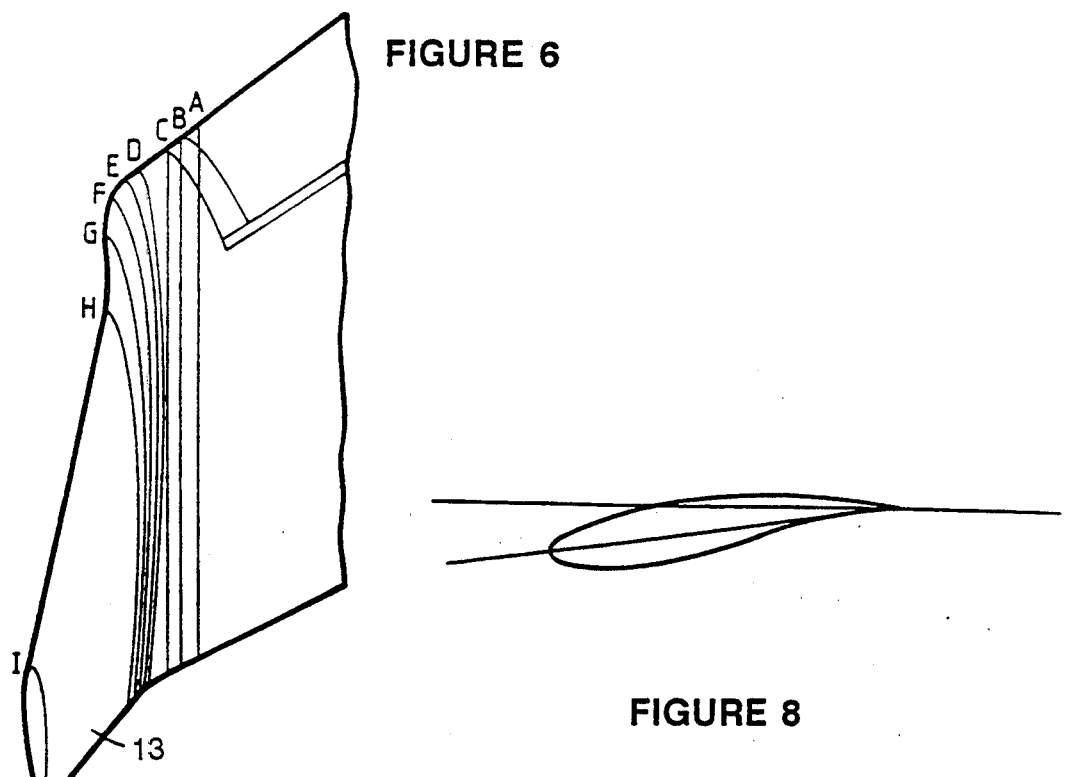
FIG. 6 is a top plan view of a winglet.

As best seen in FIG. 4, winglet 13 of composite tip/winglet assembly 12 is generally trapezoidal in shape. In a presently preferred embodiment, for the 727 airplane, root chord 27 is about 60" and extends from trailing edge 29 of wing 10 to a point aft of leading edge 30 of wing 11. The leading edge 31 of winglet 13 inclines upwardly from a point aft of leading edge 30 of wing 10 at a leading edge angle 34 of about 50° from the vertical. Tip chord 32 of winglet 13 is about 20" and is parallel to root chord 27. Winglet 13 has a span 35 of about 60", as shown in FIG. 5. Composite tip/winglet assembly 12 desirably is fabricated from a composite of epoxy glass reinforced with carbon fibers.

Composite tip/winglet assembly 12 is mounted to wing 10 such that winglet 13 cants outward from the wing at an inclination angle 36 of about 25° from the vertical, as shown in FIG. 5. The outward cant of the winglet aids in eliminating wing flutter, while increasing wing load. Winglet 13 gradually decreases in thickness between root chord 27 and tip chord 32; however, airfoil geometry is constant throughout its length. Preferably, maximum thickness ratio t/c is 0.075 throughout winglet 13, where t is the thickness dimension of winglet 13 and c is the chord length at any particular point along the height of winglet 13.

Figure 8:
FIG. 8 depicts the camber of a winglet taken along section line 8—8 of FIG. 7.
Figure 7:
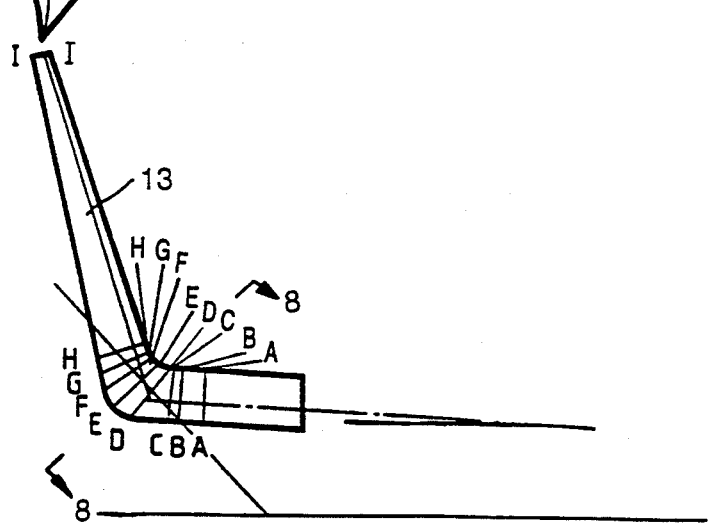
FIG. 7 is a rear elevational view of a winglet.
Figure 9F:
FIGS. 9A-9I depict airfoil sections of a winglet, showing cross-sectional geometry of the winglet along section lines A—A through I—I of FIG. 7.
Figure 9G:
Figure 9H:
Figure 9I:
Figure 9E:
Figure 9D:
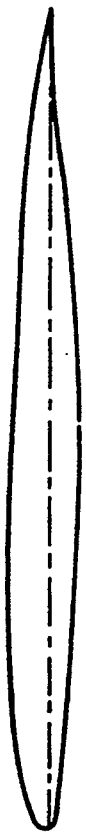
Figure 9C:
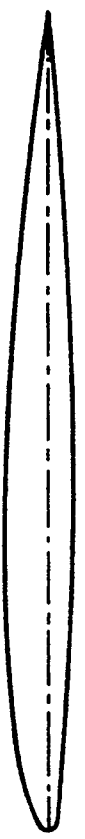
Figure 9B:
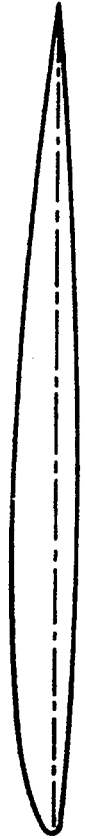
Figure 9A:

As best seen in FIGS. 6 through 9I, winglet 13 is contoured such that camber increases gradually from tip chord 32 to root chord 27. Such contouring minimizes in-flight profile drag caused by winglet 13. FIG. 8 shows that, when viewed along its chordal plane, root chord 27 is toed out, or twisted, at a maximum twist away from the aircraft fuselage of 3°. FIGS. 7 and 9A–9I illustrate the winglet loft definition, showing the variation in airfoil sectional shapes of winglet 13 along its height, at section lines A—A through I—I, respectively.

In installation of the composite tip/winglet assembly 12, as shown in FIG. 3, the original wing tips are removed to a spanwise location on the wing 10 at about wing buttock line ("WBL") 602.5. Each composite tip/winglet assembly 12 is attached at WBL 602.5 and at WBL 625.0 to wing spar joints 40, 41 of wing 10 via upper and lower composite skin panels 24 and spar joints 45, 46 of assembly 12. Composite tip/winglet assembly 12 is mounted to airplane wing 10 at existing closeout rib 11.

The composite tip/winglet assembly 12 incorporates the existing mechanical systems found in the original wing tip, specifically anti-collision lights, fuel dumping and fuel venting mechanisms, and trailing edge logo lights.

All existing systems and structures, namely navigational, anti-collision and logo lights, wing tip fairing, flux valve, upper surface panel, fuel vent and vent pipe, fuel dump pipe, secondary wing structure, and front and rear spars are removed from the existing wing structure 10 during installation and then are replaced. System mount points are prepared inside tip/winglet assembly 12 for reinstallation of existing systems. A winglet mount tool is installed into existing wing structure 10. Composite tip/winglet 12 is installed into the winglet mount tool. Existing spar joints 40, 41 are drilled, trimmed and spliced to composite spars 45, 46 using shear pins. Existing systems then are reconnected. Upper and lower composite skin panels 24 are trimmed to create an aerodynamically smooth surface and connected to composite tip/winglet assembly 12 via pins.

Figure 10:
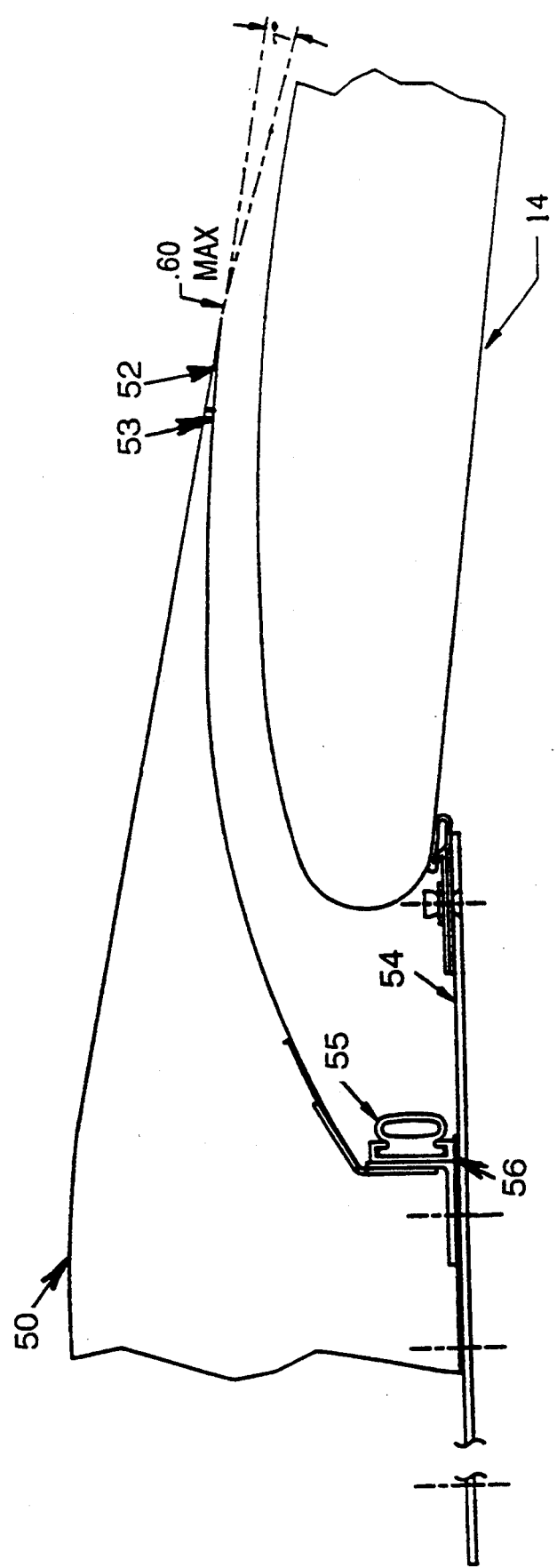
FIG. 10 is a cross-sectional, elevational view of the inboard flap assembly, showing the modification of the present invention.

"Droop" is accomplished by changes to standard rigging settings. As seen in FIG. 10, aft flap modifications are made by re-rigging the aft flaps permanently downward from their unmodified neutral positions and replacing the existing push rods which operate both the inboard and outboard flaps, as existing flap push rods are not sufficiently long to permit the required modifications of the flap settings. FIG. 10 shows inboard aft flap 14 permanently re-rigged in accordance with the present invention. In a preferred embodiment, inboard aft flap 14 is re-rigged such that its permanent position is 7° downward from the unmodified neutral position. Outboard aft flap 18 also is re-rigged downward from the unmodified neutral position. In a preferred embodiment, outboard aft flap 18 is re-rigged such that its permanent position is 3.0° downward from the unmodified neutral position. Skin extension strip 52 is added to extend lower skin 53 of mid flap 50 as shown in FIG. 10. Existing push rod 54 has been lengthened in accordance with the modified aft flap position as shown in FIG. 10.

Aileron deflection is accomplished by differential changes to standard rigging settings in existing aileron control systems. In a preferred embodiment, inboard ailerons 16 are deflected downward 2° from the unmodified neutral position.

Thus, existing ailerons and flaps are re-rigged from the unmodified 727 wing structure in the fully retracted state to new, permanent positions such that their trailing edges in the fully retracted state extend downward from their unmodified, neutral positions as follows:

| Control Surface | Change from Neutral Setting |
| --- | --- |
| Inboard aft flap | Deflected downward 7.0 degrees |
| Inboard aileron | Deflected downward 2.0 degrees |
| Outboard aft flap | Deflected downward 3.0 degrees |

These settings result in "droop" of the ailerons and flaps.

Figure 11A:
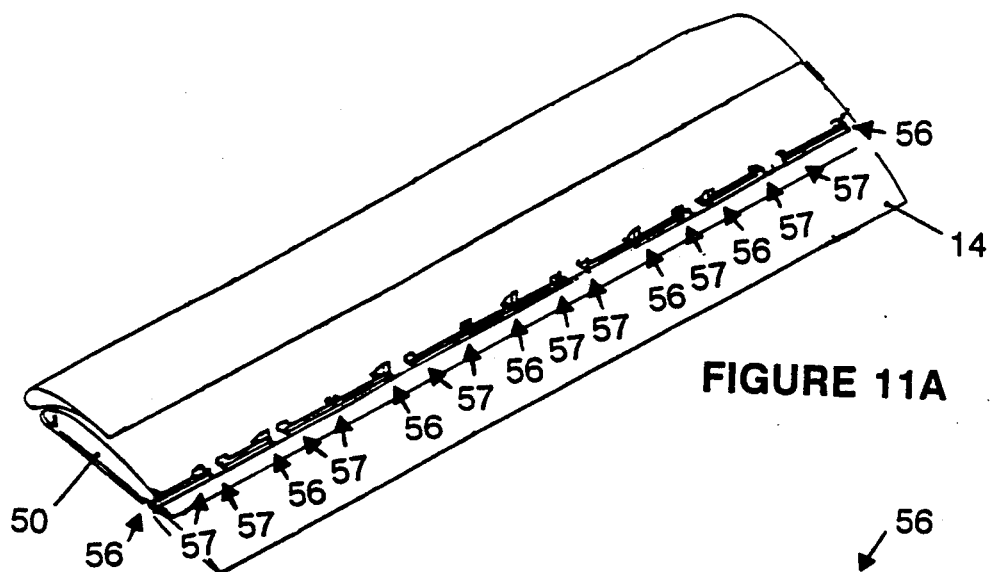
FIGS. 11(a), 11(b), and 11(c) show the changes to the airseal retaining structures of the inboard flap assembly of the present invention, with FIG. 11a showing a rear perspective view of the locations of modifications to the airseal retaining structures, and FIGS. 11b and 11c showing rear perspective views of the modified airseal retaining structures.
Figure 11B:
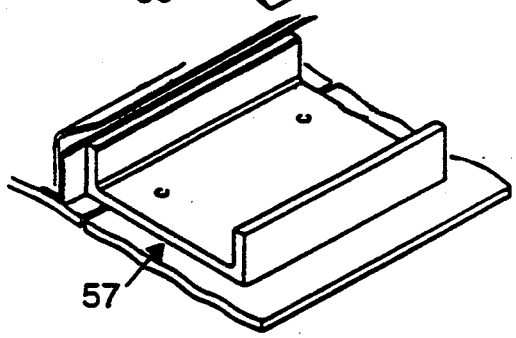
Figure 11C:
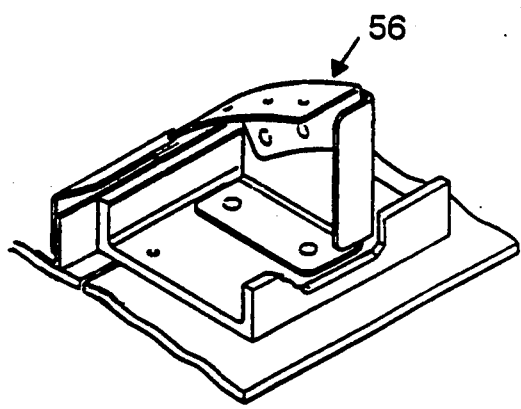
Figures 12A, 12B:
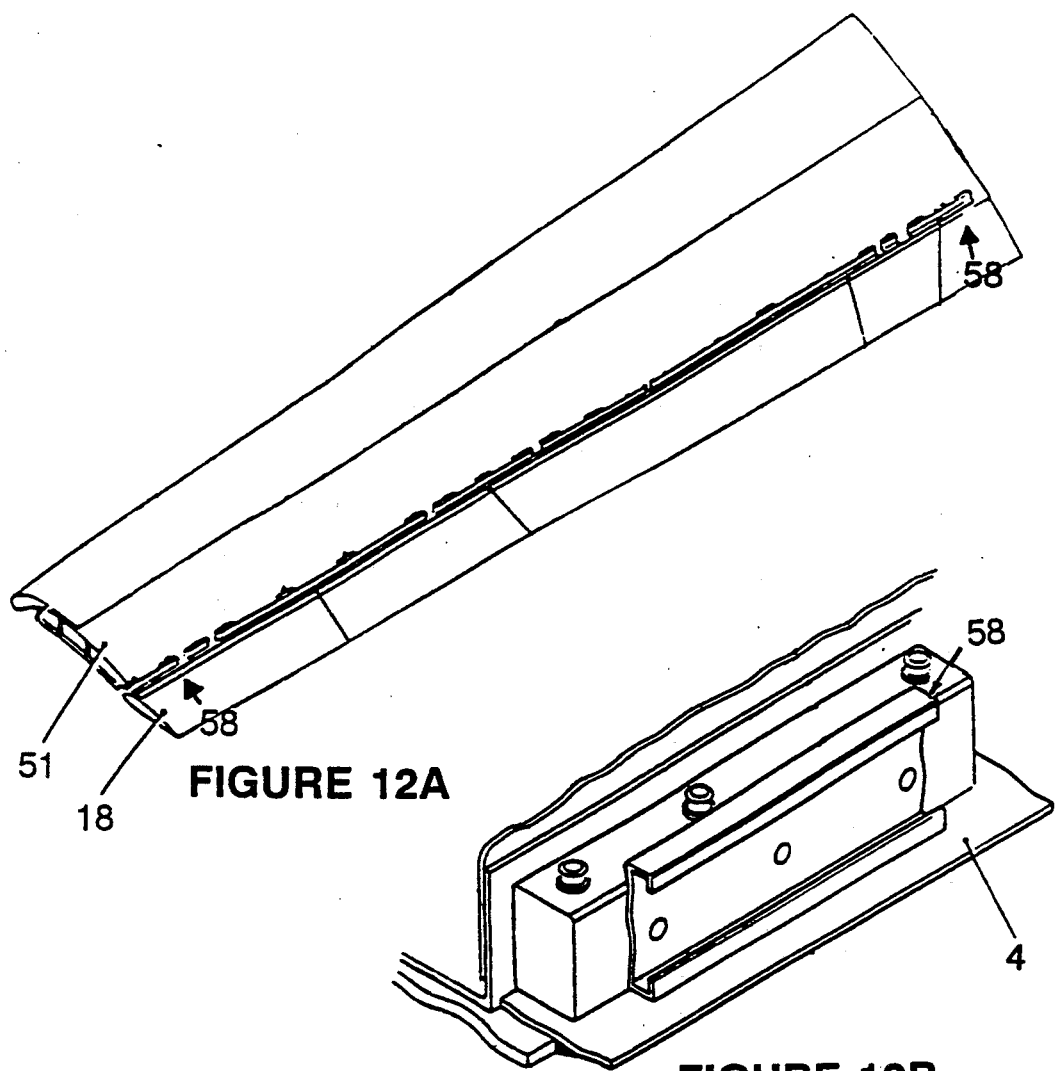
FIGS. 12(a) and 12(b) show the changes to the airseal retaining structures of the outboard flap assembly of the present invention, with FIG. 12a showing a rear perspective view of the locations of modifications to the airseal retaining structures, and FIG. 12b showing a rear perspective view of the modified airseal retaining structure.

As best seen in FIGS. 11a, 11b, 11c and 12a and 12b, existing airseals between mid flaps 50 and 51 and each of the aft flaps 14 and 18, respectively, are moved aft by means of modified structure. An existing airseal 55 is located within an airseal retaining member 56 as shown in FIG. 10. As shown in FIGS. 11b, 11c and 12b, existing airseal retaining members 56, 57 and 58 are moved aftward, whereupon the existing airseal for the respective inboard and outboard flap assemblies can be remounted.

The installation of this winglet system and modifications can be performed within about five days by qualified mechanics.

Figure 13:
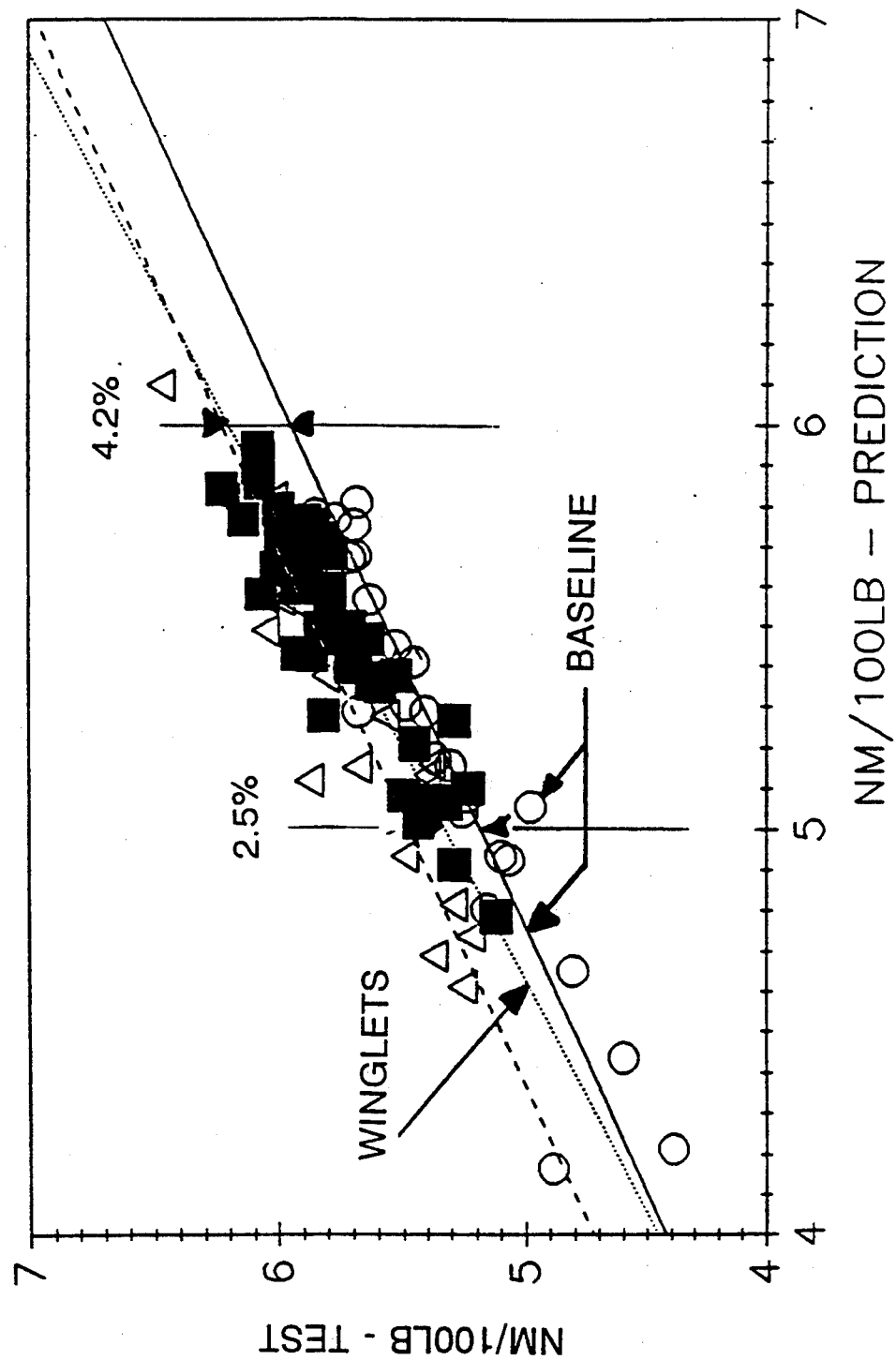
FIG. 13 is a plot of measured fuel mileage and predicted fuel mileage by 727 aircraft modified with winglets of the present invention.

Adding the winglets and modifying the aileron and flap settings has been found to result in a substantial reduction in fuel use. FIG. 13 shows a plot of in-flight measured fuel mileage of a 727 aircraft with winglets, and aileron and flap modifications in accordance with the invention, versus predicted fuel mileage using a performance model for the basic 727 JT8D-7B powered aircraft. The source of the data was measured fuel flow using three calibrated fuel flow meters. The plot shows the baseline data (open circles) as compared to the winglet system modification data (filled squares). The improvement in fuel mileage resulting from use of the winglet system varies between 2.5% and 4.2%, the higher figure corresponding generally to high altitude/weight conditions, and conversely for the lower figure. These results are about 1% higher than theory would predict.

Figure 14:
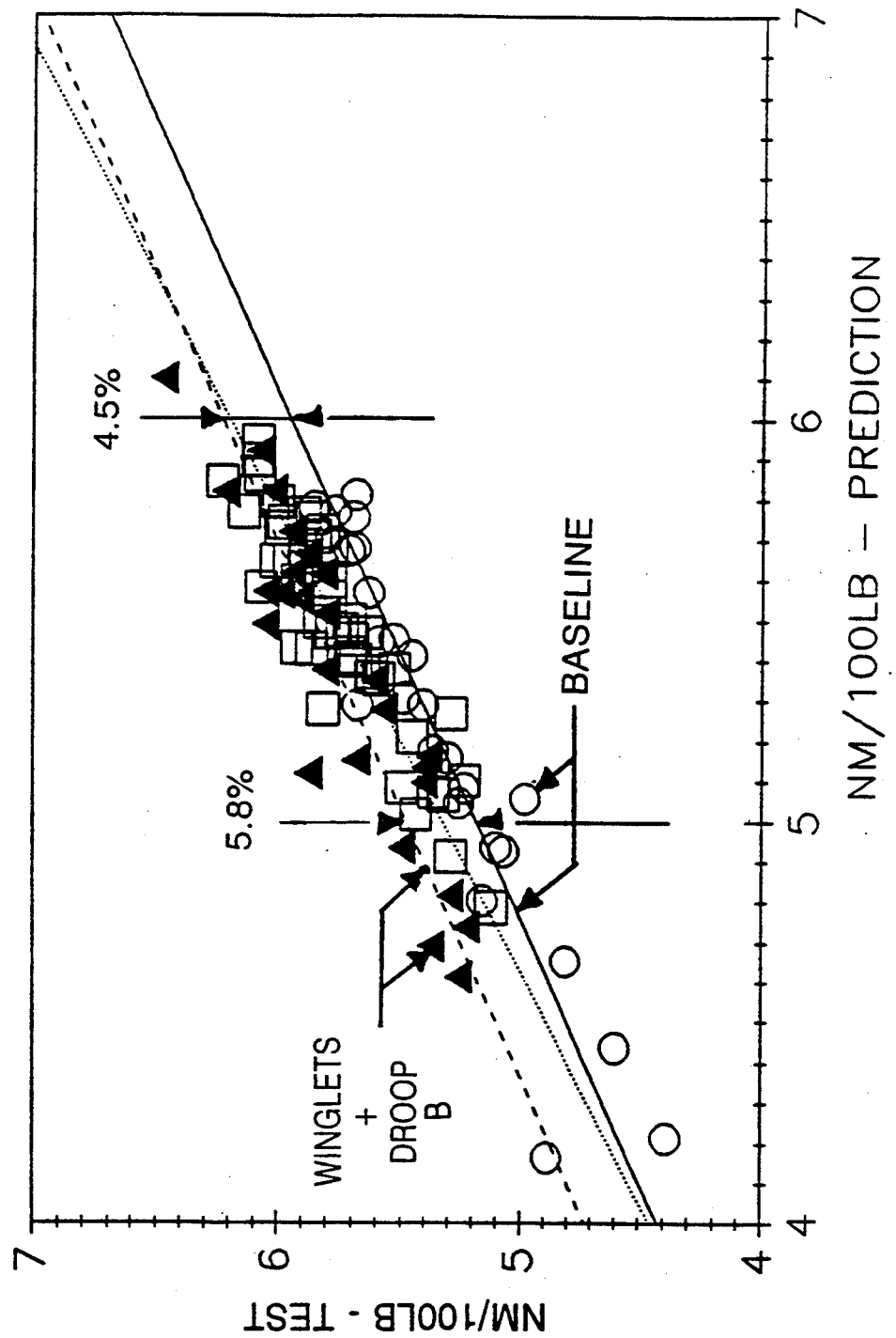
FIG. 14 is a plot of measured fuel mileage and predicted fuel mileage obtained through use of the winglets together with the flap and aileron modifications of the present invention.

FIG. 14 shows a similar plot for the winglet system with modified settings of flaps and ailerons, or "droop". Once again, the baseline data are open circles, and the modified configuration is represented by the filled triangles (the open squares are based on the winglet configuration from the data of FIG. 13). The fuel mileage improvement is seen to vary between 5.8% and 4.5%. The greater improvement occurs generally at higher Mach numbers, and diminishes at low weight and lower Mach number.

Figure 15:
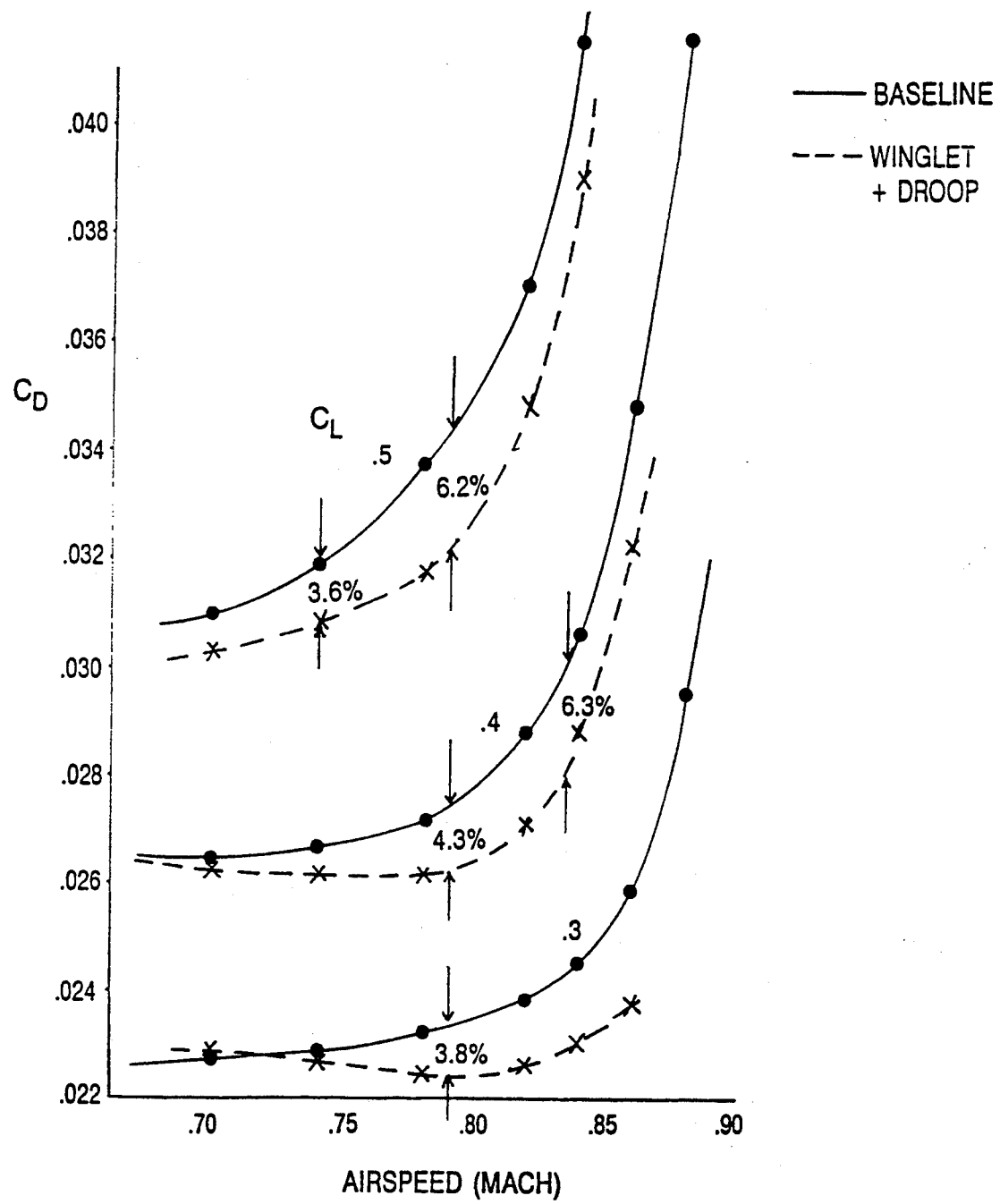
FIG. 15 is a plot of aircraft drag coefficient, derived from fuel mileage measurements, versus airspeed for 727 aircraft modified in accordance with the present invention.

Drag coefficient also has been shown to improve using the winglet system of the present invention. FIG. 15 shows airplane drag coefficient (Cd) versus airspeed (Mach) for 727 aircraft modified in accordance with the present invention, for three lift coefficients. Generally, the drag reduction increases with both lift coefficient and Mach number.

In addition to high speed drag reductions, reducing low speed drag by about 3% increases the take-off weight by 5,000 lbs., so that a greater payload may be carried, or a shorter runway may be used for take-off.

Figure 16:
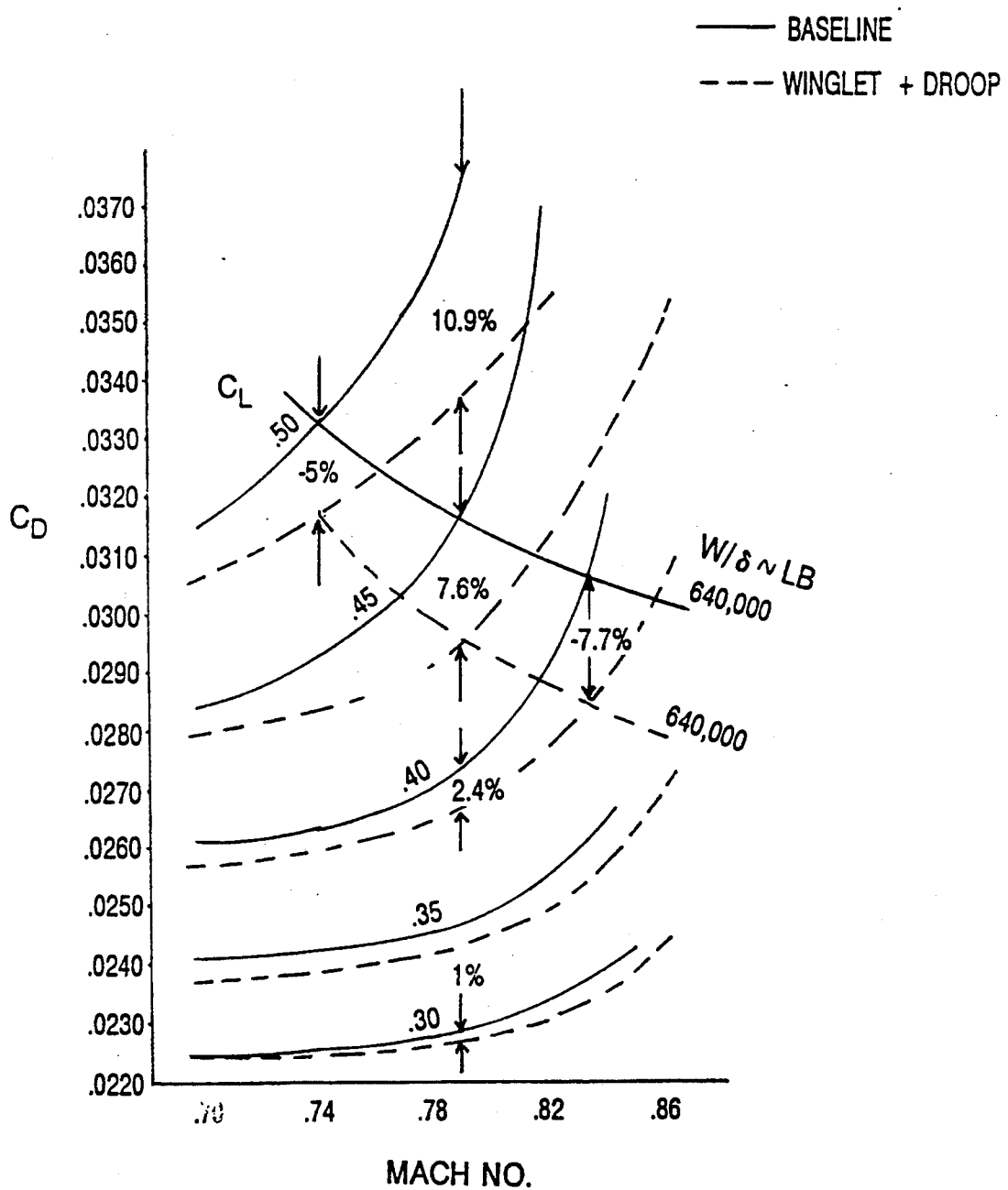
FIG. 16 is a plot of drag, derived from engine pressure ratio measurement, versus airspeed for 727 aircraft modified in accordance with the present invention.

FIG. 16 shows drag calculated from engine pressure ratios for a 727 aircraft modified in accordance with the present invention. The results shown in FIG. 16 exhibit very similar improvement trends to those obtained from the fuel mileage data shown in FIG. 15. The specific percent drag reductions differ, but the overall improvement is close to that derived from the fuel mileage data. In both cases, two primary areas of improvement are seen. First, the drag reduction increases with increasing lift coefficient at low or high Mach number, the direct effect of the winglets, which reduce lift dependent drag. Second, the drag reduction increases as Mach number increases, the effect of the "droop" change that effectively increases the drag divergence Mach number of the wing (the Mach number at which the drag starts to go up very rapidly). Further, it has been found from flight tests that the airplane has noticeably better climb and initial cruise altitude capability.

Figure 17A:
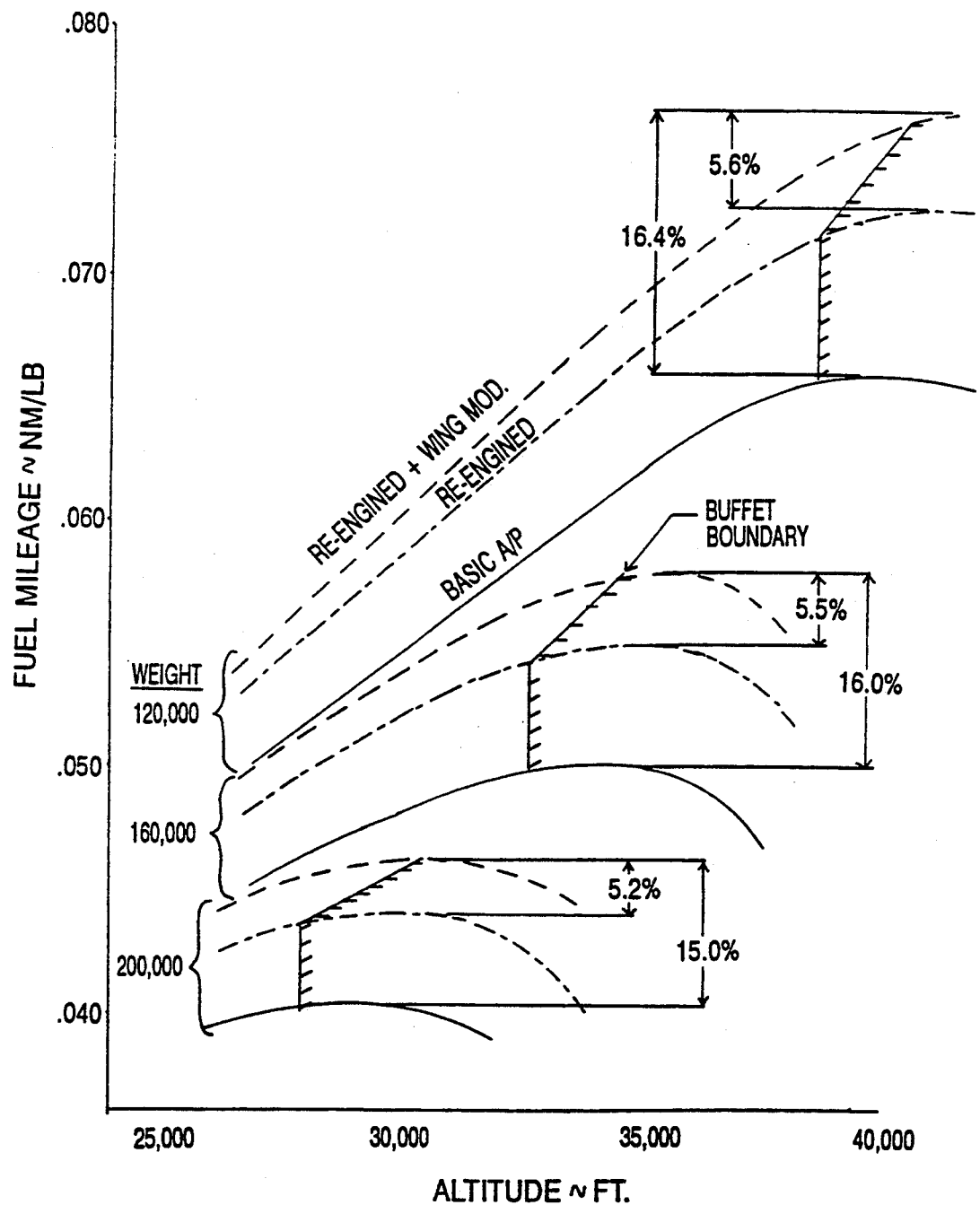
FIG. 17A is a plot of fuel mileage versus cruise altitude of a 727 aircraft with winglet and flap and aileron modifications of the present invention, with the airplane traveling at an airspeed of Mach 0.79.
Figure 17B:
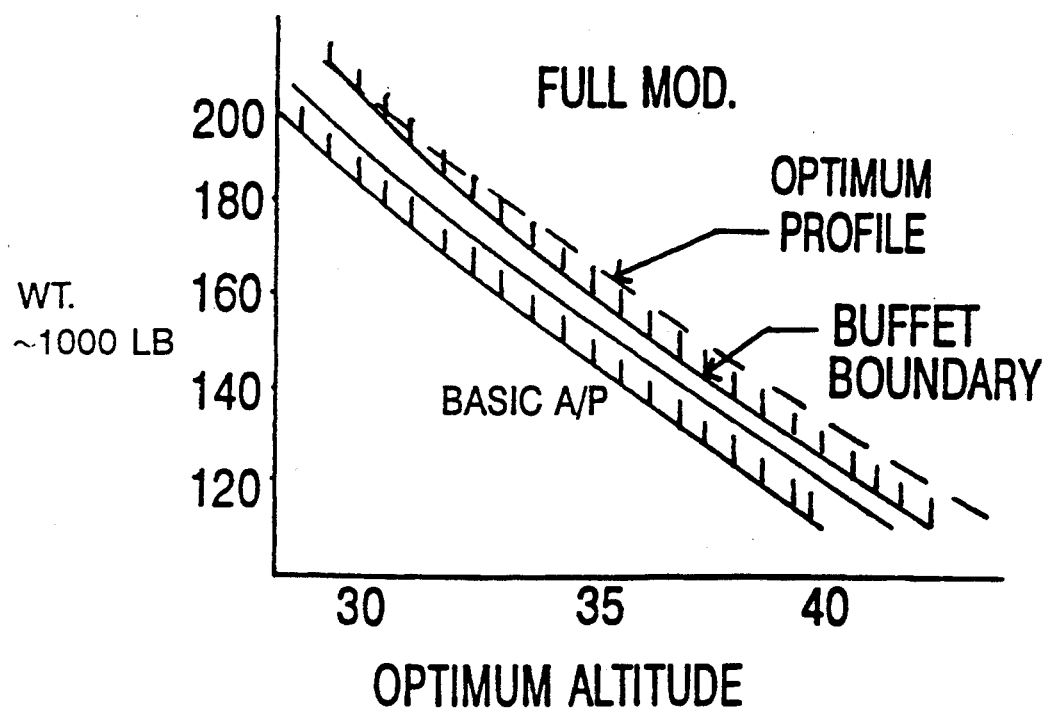
FIG. 17B is a plot of buffer boundaries in relation to airplane gross weight and cruise altitude of a 727 aircraft with winglet and flap and aileron modifications of the present invention, with the airplane traveling at an airspeed of Mach 0.79.
Figure 18A:
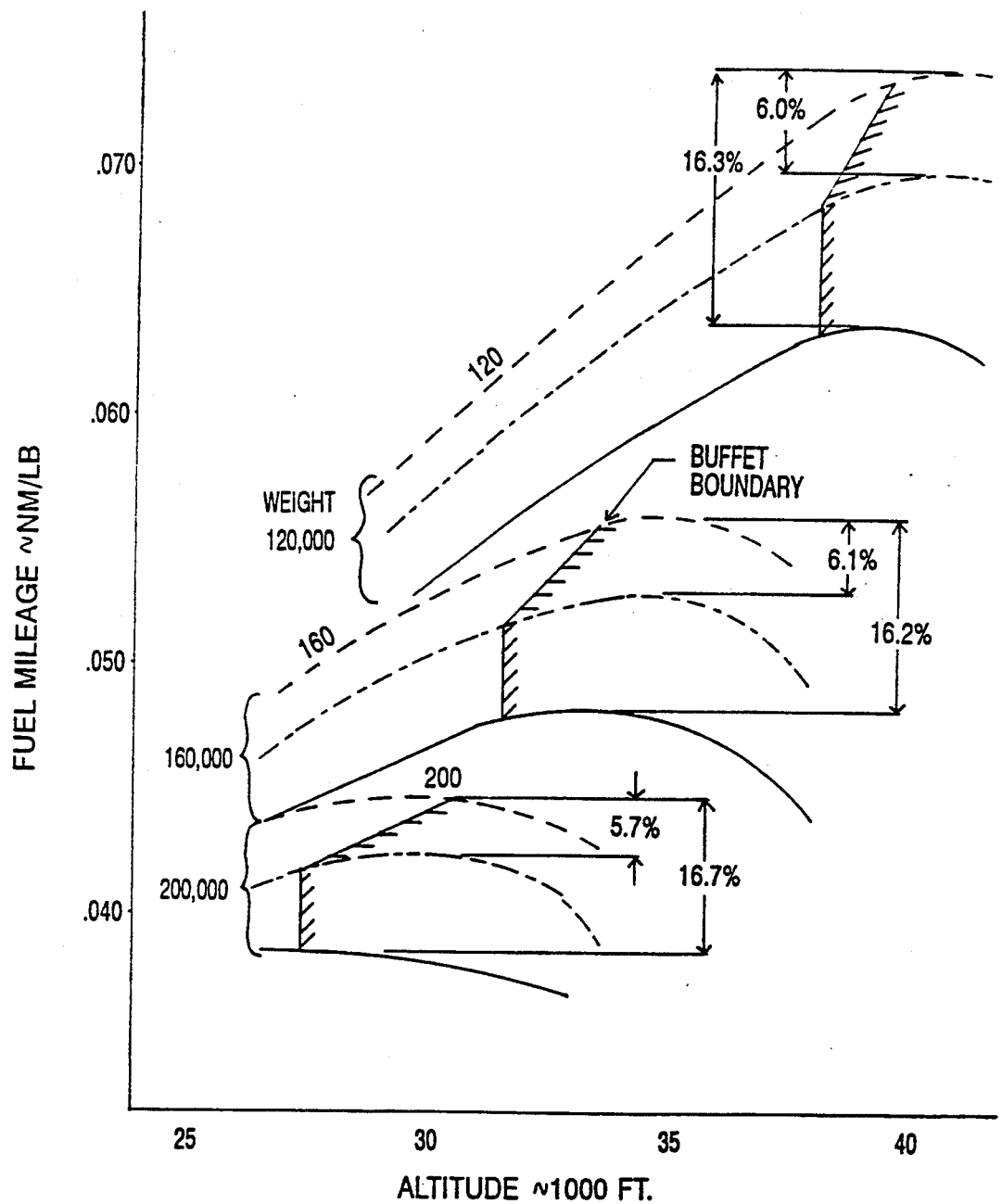
FIG. 18 is a plot of fuel mileage versus cruise altitude of a 727 aircraft with winglet and flap and aileron modifications of the present invention, with the airplane traveling at an airspeed of Mach 0.82.
FIG. 18B is a plot of buffer boundaries in relation to airplane gross weight and cruise altitude of a 727 aircraft with winglet and flap and aileron modifications of the present invention, with the airplane traveling at an airspeed of Mach 0.82.
Figure 18B:
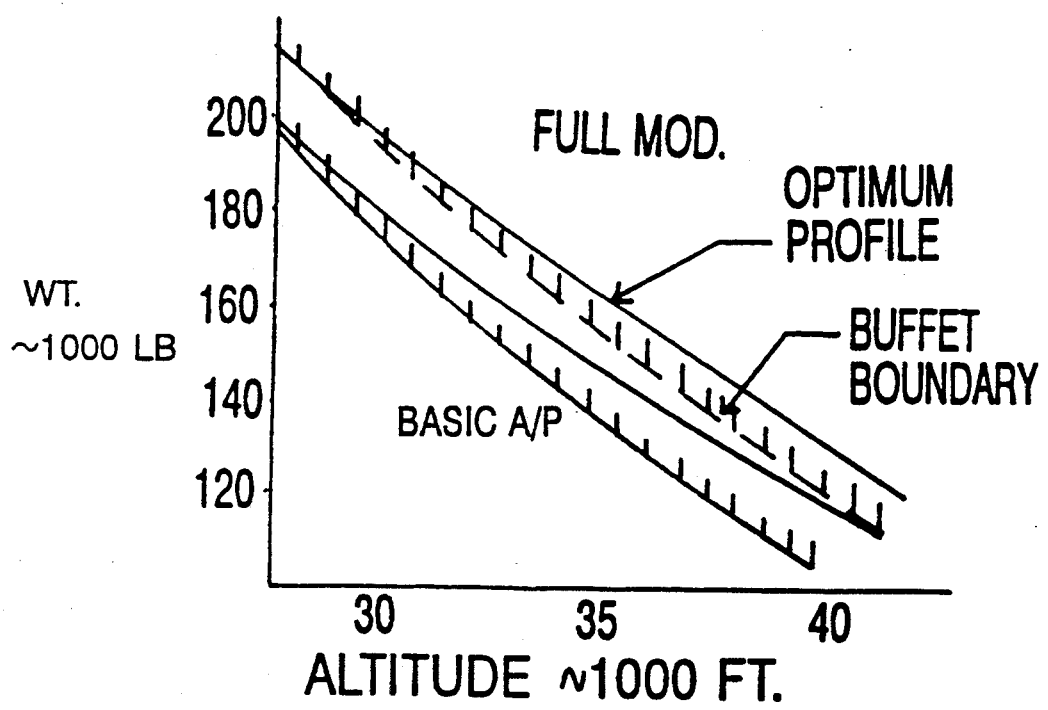

Fuel mileage trends are summarized in FIGS. 17A, B and 18A, B. These plots show fuel mileage against cruise altitude for three gross weight conditions. The calculations have been made for the unmodified 727-200 aircraft and for 727-200 model aircraft with the "droop" modification of the present invention. FIGS. 17A, B are for an airspeed of Mach 0.79 while FIGS. 18A, B are for an airspeed of Mach 0.82.

The improved fuel mileage for both the winglet and "droop" modifications is evident from the comparisons. At the optimum cruise altitude, ignoring buffet margins, the improvement is between 5.2% and 5.6% for Mach 0.79, and between 5.7% and 6.0% for Mach 0.82. However, if buffet margin constraints are imposed on the aircraft, the increase is about 6.5% at Mach 0.79 and about 7.2% at Mach 0.82.

FIG. 19 summarizes the results for a 727-200 model airplane modified in accordance with the invention, including both winglets and "droop" modifications, and also as re-engined, showing compounded increases in fuel mileage of about 16%.

Thus, the improvements of the present invention are amplified by combining the present modifications with a re-engining of the airplane to meet Stage 3 noise level requirements. The re-engining system is that shown and described in U.S. Pat. No. 4,836,469, patented Jun. 6, 1989, which is incorporated by reference herein.

It should be apparent to those skilled in the art that other modifications could be made in the device without departing from the spirit and scope of the invention.

We claim:

1. A method for increasing fuel mileage and decreasing drag in an existing 727-type jet airplane, comprising:
   a. removing an existing wing tip on each airplane wing;
   b. mounting a winglet to the outboard end of each airplane wing;
   c. re-rigging the fixed positions of inboard ailerons of each airplane wing downward to new, fixed positions such that trailing edges of said re-rigged ailerons are downward of the unmodified neutral positions of said trailing edges of said ailerons; and d. re-rigging the fixed positions of inboard and outboard aft flaps of inboard and outboard flap assemblies of each airplane wing downward to new, fixed positions in such manner that trailing edges of said re-rigged aft flaps are downward of the unmodified neutral positions of said trailing edges of said aft flaps;

whereby during flight said winglets reduce drag and increase fuel mileage, and said re-rigged inboard and outboard aft flaps and inboard ailerons redistribute in an inboard direction wing bending and shear loads caused by the addition of said winglets to said airplane wings and contribute to increasing the drag divergence Mach number, the wing buffet margin and fuel mileage.

2. The method of claim 1, wherein the leading edge angle of each winglet is set at about 50° from the vertical plane extending from the leading edge of each airplane wing.

3. The method of claim 1, wherein each winglet is mounted on the tip of each airplane wing at a cant angle of about 25°.

4. The method of claim 1, wherein the root chord of each winglet is twisted away from the fuselage of said airplane.

5. The method of claim 4, wherein the twist of said winglet root chord is not greater than about 3°.

6. The method of claim 1, wherein:
 a. positions of existing inboard aft flaps are re-rigged downward from the unmodified neutral position by about 7.0 degrees;
 b. positions of existing inboard ailerons are re-rigged downward from the unmodified neutral position by about 2.0 degrees; and
 c. positions of existing outboard aft flaps are re-rigged downward from the unmodified neutral position by about 3.0 degrees.

7. The method of claim 1, wherein:
 a. the leading edge angle of each winglet is set at about 50° from a vertical plane extending from the leading edge of the airplane wing;
 b. each winglet is mounted on the tip of the airplane wing at a cant angle of about 25°;
 c. the root chord of each winglet is twisted not more than 3° away from the fuselage of the airplane;
 d. positions of existing inboard aft flaps are re-rigged downward from the unmodified neutral position by about 7.0 degrees;
 e. positions of existing inboard ailerons are re-rigged downward from the unmodified neutral position by about 2.0 degrees; and
 f. positions of existing outboard aft flaps are re-rigged downward from the unmodified neutral position by about 3.0 degrees.

8. An airplane modification kit for adapting an existing 727-type jet airplane so as to have increased fuel mileage and to meet governmental safety regulations, comprising:
 a. at least one winglet adapted to be mounted to a tip of each wing of said airplane;
 b. means for re-rigging the fixed neutral positions of inboard ailerons of said wing to fixed drooped positions downward of unmodified neutral positions of said ailerons; and
 c. means for re-rigging the fixed neutral positions of inboard and outboard aft flaps of said wing to fixed drooped positions downward of unmodified neutral positions of said aft flaps;

whereby at least some of the kit components are adapted to be substituted for existing components of said wing to modify said airplane to increase fuel mileage and decrease drag.

9. The airplane modification kit of claim 8, further comprising a composite tip/winglet assembly adapted to be mounted to an outboard tip of the wing of said airplane.

10. The airplane modification kit of claim 8, wherein said winglet is made of a composite of epoxy glass and carbon fibers.

11. The airplane modification kit of claim 8, wherein the thickness to chord ratio of said winglet remains constant through the height of said winglet.

12. The airplane modification kit of claim 8, wherein the maximum thickness ratio t/c is 0.075, where t is the thickness dimension of said winglet and c is the chord length at any particular point along the height of said winglet.

* * * * *